United States Patent [19]

Sizer, II

[11] Patent Number: 4,930,131
[45] Date of Patent: May 29, 1990

[54] SOURCE OF HIGH REPETITION RATE, HIGH POWER OPTICAL PULSES

[75] Inventor: Theodore Sizer, II, Little Silver, N.J.
[73] Assignee: AT&T Bell Laboratories, Murray Hill, N.J.
[21] Appl. No.: 294,034
[22] Filed: Jan. 6, 1989
[51] Int. Cl.$^5$ .............................................. H01S 3/098
[52] U.S. Cl. ...................................... 372/18; 372/25; 372/26; 372/28
[58] Field of Search ................ 372/18, 22, 23, 25–32; 350/163, 174, 162.12

[56] References Cited

U.S. PATENT DOCUMENTS

| 4,737,958 | 4/1988 | Sizer | 372/18 |
| 4,752,931 | 6/1988 | Dutcher et al. | 372/32 |
| 4,791,633 | 12/1988 | Esherick et al. | 372/32 |

FOREIGN PATENT DOCUMENTS

| 0119991 | 6/1987 | Japan | 372/32 |

OTHER PUBLICATIONS

P. W. Smith, *Proceedings of the IEEE*, vol. 60, No. 4, Apr. 1972, "Mode Selection in Lasers", pp. 422–440.
Eisenstein et al., *IEEE Journal of Quantum Electronics*, vol. QE-22, No. 1, Jan. 1986, "Active Mode-Locking Characteristics of InGaAsP-Single Mode Fiber Composite Cavity Lasers", pp. 142–148.

*Primary Examiner*—William L. Sikes
*Assistant Examiner*—Georgia Y. Epps
*Attorney, Agent, or Firm*—Gregory C. Ranieri

[57] ABSTRACT

An optical device is disclosed wherein a Fabry-Perot etalon (12) is used as a spectral mode selector externally coupled to a source of modelocked optical pulses (10). By adjusting the cavity length of the etalon (12), a plurality of equally spaced predetermined modes output from the source are transmitted by the etalon. These modes which are transmitted combine coherently to create a stream of optical pulses (16) having a higher repetition rate than the repetition rate of the source.

18 Claims, 3 Drawing Sheets

SOURCE OF HIGH REPETITION RATE, HIGH POWER OPTICAL PULSES

TECHNICAL FIELD

This invention relates to optical sources and, in particular, to optical sources which generate a stream of optical pulses characterized by high power and high repetition rate.

BACKGROUND OF THE INVENTION

For many optical system applications, there is a requirement for a high power, high repetition rate laser source. One example of such an application is optical computing which requires a source having a few watts of average power at a repetition rate of more than a gigahertz. Currently, there are no optical sources which satisfy these two important requirements. Semiconductors laser operate at repetition rate up to the GHz regime with only an average power of a few milliwatts, while solid state lasers are capable of producing tens of watts of average power at repetition rates less than 100 MHz.

SUMMARY OF THE INVENTION

A source of high repetition rate, high power optical pulses is achieved by transmitting selected spectral modes of a stream of modelocked optical pulses. By increasing the separation between adjacent spectral modes form the modelocked laser, the repetition rate of the stream of optical pulses is increased by a desired factor.

In one embodiment of the invention, a Fabry Perot etalon is used as a spectral mode selector externally coupled to a source of modelocked optical pulses. By adjusting the cavity length of the etalon, a plurality of equally spaced predetermined spectral modes output from the source are transmitted by the etalon. Spectral modes which are transmitted combine coherently to create a stream of optical pulses having a higher repetition rate than the repetition rate of the source. In summary, by transmitting every $M^{th}$ spectral mode, the repetition rate is correspondingly increased by the factor M, where M is a positive integer greater than 1.

BRIEF DESCRIPTION OF THE DRAWING

A more complete understanding of the invention may be obtained by reading the following detailed description in conjunction with the drawings wherein.

DETAILED DESCRIPTION

Figure 1:
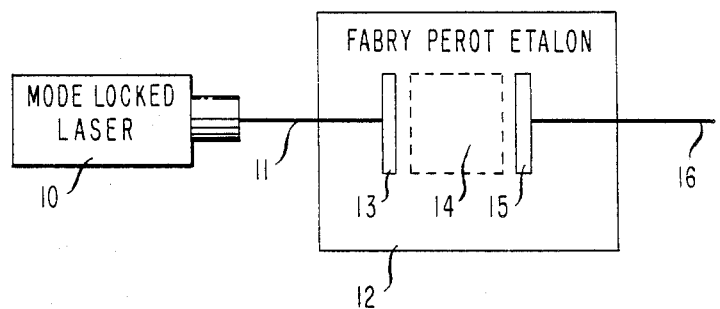
FIG. 1 is a schematic block diagram of an optical device for generating high repetition rate, high power optical pulses in accordance with the principles of the invention.

As shown in FIG. 1, the present invention is a source of high repetition rate and high power optical pulses. It is based upon the discovery that transmitting selected spectral modes of a stream of modelocked optical pulses will increase the repetition rate of the stream of optical pulses by a desired factor.

Figure 2:
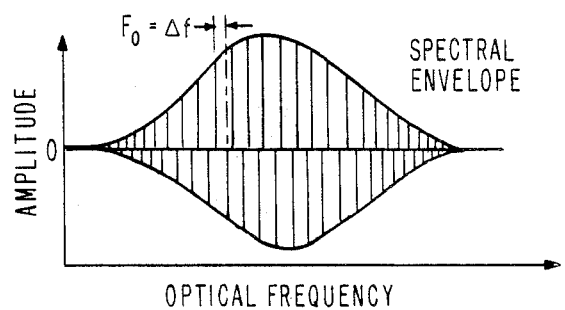
FIG. 2 is a graph of the spectral mode amplitude versus frequency profile of optical pulses output from a modelocked laser shown in FIG. 1.

In accordance with the principles of the invention, stream of optical pulses 11 from stable modelocked laser 10 propagates through Fabry Perot etalon 12 generating stream of optical pulses 16 having a greater repetition rate than stream of optical pulses 11. In modelocked laser 10, the spectrum of the stream of optical pulses 11 generated consists of a series of lines called spectral modes underneath a spectral envelope, also called the laser spectrum, determined by the gain medium of the laser. As illustrated in FIG. 2, which represents typical spectral mode components, stream of optical pulses 11 from modelocked laser 10 has oscillations at a number of optical frequencies, whose spectral mode separation, $\Delta f$, is determined by the speed of light, c, divided by the twice the length of the modelocked laser resonator, l, and mathematically expressed by the equation $\Delta F = C/2l$. These spectral modes have the same spatial energy distribution in the plane transverse to the resonator and locking the phase of each these spectral modes causes output 11 to consists of a periodic train of optical pulses having a fixed repetition rate, $F_0$, equal to the spectral mode separation.

Figure 3:
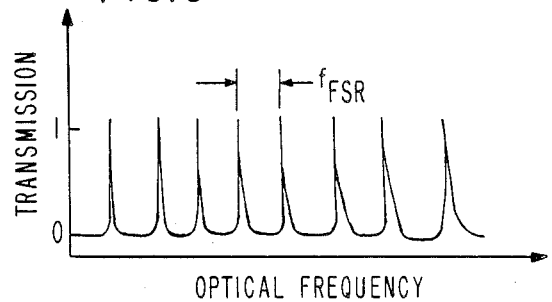
FIG. 3 is a graph of the transmission versus frequency profile of a Fabry Perot etalon shown in FIG. 1.

As indicated in FIG. 1, reflectors 13 and 15 in combination with optical medium 14 are arranged to form Fabry Perot etalon 12. As illustrated in FIG. 3, the transmission versus frequency profile of Fabry Perot etalon 12 shows a separation, $f_{FSR}$, between transmission peaks known as the "Free Spectral Range" which is dependent on the separation between reflectors 13 and 15, d, and the refractive index, n, of optical medium 14 enclosed thereby. Moreover, the "Free Spectral Range is related to these parameters by the equation $f_{FSR} = c/2nd$. The separation between reflectors 13 and 15 of etalon 12 is adjusted so that the separation between transmission peaks of etalon 12 is M times the separation between spectral modes from modelocked laser 10. Acting as a spectral mode selector, etalon 12 transmits every $M^{th}$ spectral mode from modelocked laser 10. This increases the effective separation between adjacent spectral modes which are transmitted by etalon 12 by a factor M over the spectral mode separation of optical pulses 11. Since repetition rate is equal to spectral mode separation, a M-fold increase in the spectral mode separation causes an increase in the pulse repetition rate by a similar M-fold. It is noted that only one $M^{th}$ of all original spectral modes are transmitted through etalon 12. Correspondingly, the average power of the resulting stream of optical pulses 16 is reduced to 1/M of the original average power of optical pulses 11.

Spectral modes not transmitted by etalon 12 are reflected back toward modelocked laser 10 and can be further processed by subsequent etalons. Slight length differences in these subsequent etalons are used to select an additional M−1 sets of spectral modes having the same spectral mode separation to obtain a total of M streams of optical pulses having the same higher repetition rate.

EXAMPLE

Figure 4:
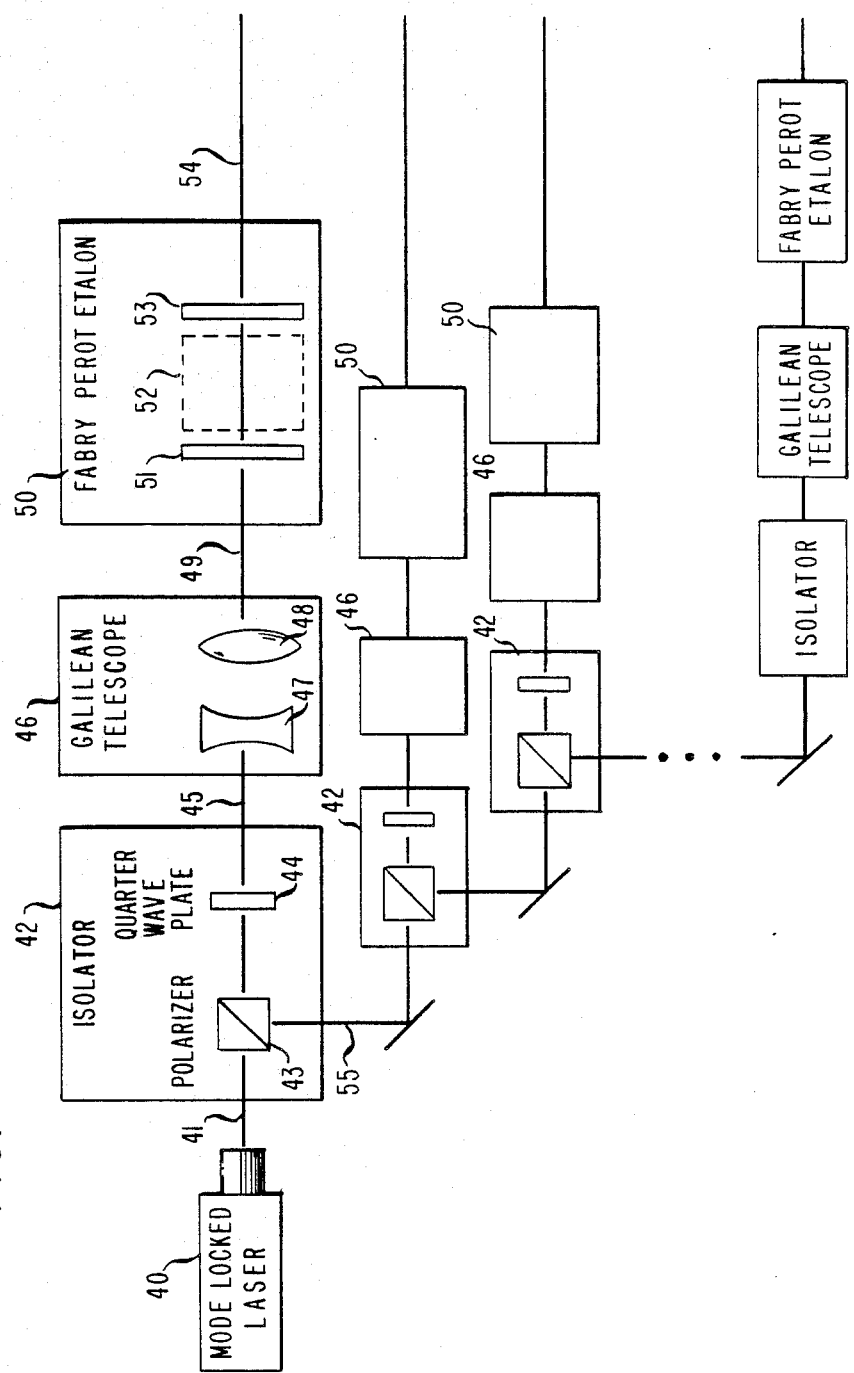
FIG. 4 is a schematic block diagram of an optical system that has been constructed to use the optical device shown in FIG. 1.

The specific embodiments which was constructed to practice the present invention is illustrated in FIG. 4. A CW modelocked Nd:YAG laser ($\lambda = 1.06 \mu m$) is used as modelocked laser 40. Stream of optical pulses 41 generated from modelocked laser 40 has the following characteristics: a repetition rate of 82 MHz, spectral mode separation of 82 MHz, a pulse width of 100 picoseconds, spectral envelope width of 16 GHz and an average power of 7 watts. Optical pulses 41 propagate through isolate 42, consisting of cube beam polarizer 43 and quarter-wave plate 44. Isolator 42 redirects any reflection from etalon 50 shown as optical pulses 55 thereby permitting egress for optical pulses 55 and preventing optical pulses 55 from returning to modelocked laser 40 so as to avoid damage thereto.

In etalon 50, reflectors 51 and 53 for this exemplary embodiment are two inches in diameter with a flatness of 1/200 of a wavelength and a reflectivity, R, of 96.7 percent. Optical medium 52 enclosed by reflectors 51 and 53 is air having an optical refractive index of approximately unity. A parameter called the finesse, F, is related to the reflectivity of reflectors 51 and 53 by the equation $$\frac{\pi \sqrt{R}}{1 - R}$$

and given the present value of R, the finesse equals 93.5. The stream of optical pulses 45 from the output of isolator 42 propagates through Galilean telescope 46 which optimizes the divergence of optical pulses 49 to match the Rayleigh range of optical pulses 45 to the optical length traversed in Fabry Perot etalon 50, given by 2nFl. In the present embodiment, the length traversed in etalon 50 is 5700 cm. As a result, the smallest beam waist which has a Rayleigh range of this length of 6.21 mm as measured at the 1/e diameter. Accordingly, optical element 47, a double concave lens, and optical element 48, a double convex lens, are therefore correspondingly chosen such that the beam waist of optical pulses 49 incident on reflector 51 is 6.21 mm.

Fabry Perot etalon 50 is mounted on a Super-Invar breadboard with precision translation stages and piezoceramic transducers to accurately adjust the separation, d, between reflectors 51 and 53. To generate a six-fold increase in repetition rate, the separation between reflectors 51 and 53 is adjusted so that the separation between transmission peaks is substantially equal to six times the separation between spectral modes from modelocked laser 40 or 492 MHz for this particular embodiment. Thus, the separation between reflectors 51 and 53, d, is one sixth the cavity length, l, of modelocked laser 40.

Figure 6:
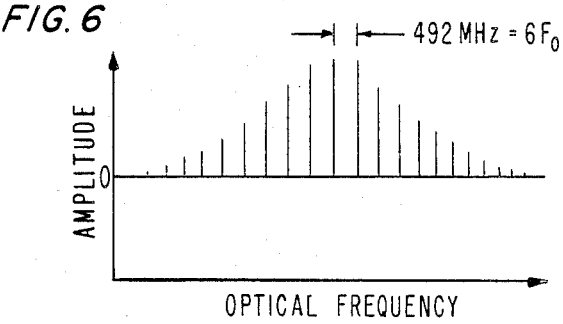
FIG. 6 is a graph of the spectral mode amplitude versus frequency profile of typical optical pulses output from the etalon shown in FIG. 4.

Spectral modes of modelocked laser 40 which are transmitted through Fabry Perot etalon 50 have a separation between adjacent spectral modes which increases six-fold as illustrated in FIG. 6. Given that the repetition rate is equal to the spectral mode separation, the repetition rate for the stream of optical pulses 54 is six times greater than the repetition rate of optical pulses 41. While the theoretical average power of resulting stream of optical pulses 54 is 1.167 watts, the actual power measured is 1 watt. The difference is presumably due to optical scattering in reflectors 51 and 53.

Reflected light 55 which is redirected by isolator 42 from etalon 50 is further processed by an arrangement similar to the combination of elements 50 and 46. It can be shown that spectrally adjacent to each selected spectral mode is a reflected spectral mode which can be selected separately to obtain a second transmitted stream of optical pulses with the higher repetition rate of 492 MHz. A slight length difference in a subsequent etalon is used for selecting the reflected spectral modes from optical pulses 55 to obtain the second stream of optical pulses. In the present embodiment, six streams of optical pulses having the higher repetition rate are obtained using a total of five Fabry Perot etalons.

Figure 5:
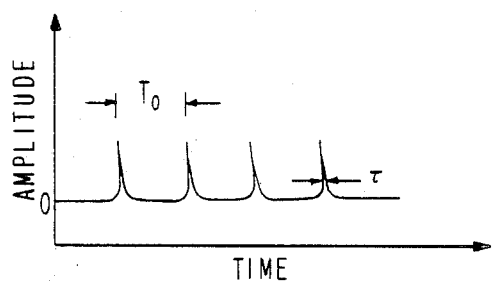
FIG. 5 is a graph of the amplitude versus time profile for typical pulses generated by a modelocked laser shown in FIG. 4.

In this exemplary embodiment, the spectral mode separation, $\Delta f$, of optical pulses 41 and thus optical pulses 49 equals 82 MHz. As illustrated in FIG. 5, note that the temporal separation, $T_0$, of optical pulses 49 is equal to the inverse of the repetition rate, $F_0$. Furthermore, the individual pulse width, $\tau$, is inversely proportional to the width of the spectral envelope, $\Delta \nu$, which is dependent on the gain medium of modelocked laser 40. Since the transmission bandwidth of etalon 50 is greater that the spectral envelope width, $\Delta \nu$, of modelocked laser 40, the overall spectrum of optical pulses 54 is the same as optical pulses 41. Hence, the individual pulse width of optical pulses 54, which is measured using an autocorrelation technique, is a 100 picoseconds. This is identical to the pulse width of optical pulses 41.

Figure 7:
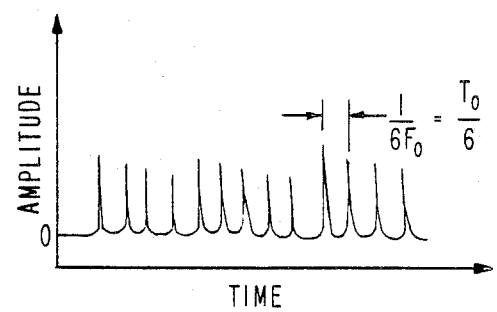
FIG. 7 is a graph of the amplitude versus time profile for typical optical pulses output from the etalon shown in FIG. 4.

Apart from the reduction in average power due to the fact that each stream of optical pulses contains only one sixth of all the original modes, the coherent summing of modes which are transmitted by etalon 50 produces a peak to peak variation of approximately 30% in the amplitude of output optical pulses 54 as shown in FIG. 7. Increasing the spectral mode separation, i.e. the value of M, increases the peak to peak amplitude variation. Amplitude variations can be reduced by the use of higher finesse Fabry Perot etalons.

Introducing optical gain in Fabry Perot etalon 50, such as by placing a Nd:YAG rod between reflectors 51 and 53, improves the amplitude stability. Also, variations in the length of the laser cavity caused by thermal loading can be minimized by the use of diode-pumped solid state lasers as sources, which have little or no thermal loading.

I claim:

1. An optical device for generating a stream of optical pulses comprising:
   a source of modelocked optical pulses occurring at a first repetition rate, and
   means coupled optically to said source for selecting at least two predetermined spectral modes output from said source to generate a stream of optical pulses at a second repetition rate, said second repetition rate being higher than the first repetition rate.

2. The optical device as defined in claim 1 wherein said means for selecting includes
   first and second reflectors spaced apart by a predetermined distance and substantially parallel to each other to form an etalon, said predetermined distance being that required for said etalon to transmit said at least two predetermined spectral modes output from said source.

3. The optical device as defined in claim 2 wherein said predetermined distance is further characterized as the distance required for said etalon to transmit a plurality of equally spaced spectral modes of said source when more than two modes are selected by said means for selecting.

4. The optical device as defined in claim 3 wherein said means for selecting further includes
means for beam shaping said optical pulses occurring at said first repetition rate, said means for beam shaping positioned intermediately between said source of modelocked optical pulses and said etalon.

5. The optical device as defined in claim 4 wherein said means for selecting further includes
means for isolating said optical pulses occurring at said first repetition rate so as to prevent said optical pulses from returning to said source.

6. The optical device as defined in claim 5 wherein said source of modelocked optical pulses includes a laser.

7. The optical device as defined in claim 6 wherein said etalon further includes
means for optically amplifying said stream of optical pulses at said second repetition rate to a predetermined power level, said means for optically amplifying includes a gain medium positioned within said etalon.

8. The optical device as defined in claim 7 wherein said gain medium includes a Nd:YAG rod.

9. An optical device for generating at least first and second streams of optical pulses comprising:
a source of modelocked optical pulses occuring at a first repetition rate,
at least first and second means each for selecting at least two predetermined spectral modes output from said source to generate said at least first and second streams of optical pulses each having a second repetition rate greater than said first repetition rate, and
means for optically directing a plurality of spectral modes reflected from said first means for selecting to said second means for selecting.

10. The optical device as defined in claim 9 wherein said at least first and second means for selecting each includes
first and second reflectors spaced apart by a predetermined distance and substantially parallel to each other to form an etalon, said predetermined distance being that required for said etalon to transmit said at least two predetermined spectral modes of said source.

11. The optical device as defined in claim 10 wherein said predetermined distance is further characterized as the distance required for said etalon to transmit a plurality of equally spaced spectral modes of said source when more than two modes are selected by said means for selecting.

12. The optical device as defined in claim 11 wherein said at least first and second means for selecting each further includes
means for beam shaping said optical pulses occurring at said first repetition rate, said means for beam shaping positioned intermediately between said means for optically directing and said etalon.

13. The optical device as defined in claim 12 wherein said at least first and second means for selecting each further includes
means for isolating said optical pulses occurring at said first repetition rate so as to prevent said optical pulses from returning to said source.

14. The optical device as defined in claim 13 wherein said at least first and second streams of optical pulses each have a different second repetition rate.

15. The optical device as defined in claim 13 wherein said at least first and second streams of optical pulses have a substantially equal second repetition rate.

16. The optical device as defined in claim 15 wherein said source of modelocked optical pulses includes a laser.

17. The optical device as defined in claim 16 wherein said etalon further includes
means for optically amplifying said stream of optical pulses at said second repetition rate to a predetermined power level, said means for optically amplifying includes a gain medium positioned within said etalon.

18. The optical device of claim 17 wherein said gain medium includes a Nd:YAG rod.

* * * * *